(12) United States Patent
Home

(10) Patent No.: US 6,978,722 B2
(45) Date of Patent: Dec. 27, 2005

(54) STRUCTURE OF A WORKING PLATFORM

(75) Inventor: William Home, Neihu (TW)

(73) Assignee: Grand Hall Enterprise Co., Ltd., Taipei (TW)

( * ) Notice: Subject to any disclaimer, the term of this patent is extended or adjusted under 35 U.S.C. 154(b) by 338 days.

(21) Appl. No.: 10/341,381

(22) Filed: Jan. 14, 2003

(65) Prior Publication Data

US 2004/0134393 A1    Jul. 15, 2004

(51) Int. Cl.[7] .............................................. A47B 13/00
(52) U.S. Cl. ............................... 108/153.1; 108/50.13; 126/41 R
(58) Field of Search .......................... 108/153.1, 50.13; 126/41 R, 25 R, 25 A, 38, 39 B, 50; 99/449

(56) References Cited

U.S. PATENT DOCUMENTS

| | | | | |
|---|---|---|---|---|
| 5,140,973 A | * | 8/1992 | Home ....................... | 126/41 R |
| 5,323,758 A | * | 6/1994 | Minshall et al. ........... | 126/25 R |
| 5,452,707 A | * | 9/1995 | Harris et al. ............... | 126/41 R |
| 5,623,866 A | * | 4/1997 | Home ....................... | 126/25 R |
| 6,131,562 A | * | 10/2000 | Schlosser et al. ......... | 126/41 R |
| 6,257,229 B1 | * | 7/2001 | Stewart et al. ............ | 126/41 R |
| 6,363,926 B1 | * | 4/2002 | Stephen et al. ........... | 126/41 R |

* cited by examiner

Primary Examiner—Jose V. Chen
(74) Attorney, Agent, or Firm—Leong C. Lei

(57) ABSTRACT

An improved structure of a working platform having a rectangular base plate, four rollers, a pair of inverted U-shaped frame supports, at least a pair of lateral support rod, a plurality of screws and at least a lateral flat plate, characterized in that the four corners of one face of the base plate are mounted with the rollers and the other face of the base plate is disposed with connection blocks, and the frame supports comprises a horizontal beam having two ends bent to form an erect tubes and the horizontal beam is protruded with a plurality of horizontal holding blocks along the direction of the lateral flat plate so that a lateral shielding plate is formed between the two erect tubes, and the erect tubes connect other tube opening of the horizontal beam is inserted correspondingly to the connection blocks. The other end of the erect tube is provided with a fastening slit, and one rod end of the lateral support rod bends out to form a top fastening plate and a bottom fastening plate. The tip of the bottom fastening plate can fasten with the other side of the straight fastening slit of the erect tubes, and the tip of the top fastening plate can directly fasten to the fastening slit. The inner edge of the bottom fastening plate is provided with lateral support rod for the supporting of a flat plate.

7 Claims, 5 Drawing Sheets

STRUCTURE OF A WORKING PLATFORM

BACKGROUND OF THE INVENTION (a) Technical Field of the Invention

The present invention relates to a working platform, and in particular, to a platform which is formed by easy connections of parts forcing the working platform.

(b) Description of the Prior Art

Working platforms are used as table for displaying of food or as a moveable trolley in food stalls or market. However, the conventional platform is difficult to dismantle and all the screws have to be removed in order to fold the platform. Thereof, the present invention is to provide an improved structure of a working platform which can solve the shortcomings of the conventional platform.

SUMMARY OF THE INVENTION

Therefore, it is an object of the present invention to provide an improved structure of a working platform having a rectangular base plate, four rollers, a pair of inverted U-shaped frame supports, at least a pair of lateral support rod, a plurality of screws and at least a lateral flat plate, characterized in that the four cornes of one face of the base plate are mounted with the rollers and the other face of the base plate is disposed with connection blocks, and the frame supports comprises a horizontal beam having two ends bent to form an erect tubes and the horizontal beam is protruded with a plurality of horizontal holding blocks along the direction of the lateral flat plate so that a lateral shielding plate is formed between the two erect tubes, and the erect tubes connect other tube opening of the horizontal beam is inserted correspondingly to the connection blocks. The other end of the erect tube is provided with a fastening slit, and one rod end of the lateral support rod bends out to form a top fastening plate and a bottom fastening plate. The tip of the bottom fastening plate can fasten with the other side of the straight fastening slit of the erect tubes, and the tip of the top fastening plate can directly fasten to the fastening slit. The inner edge of the bottom fastening plate is provided with lateral support rod for the supporting of a flat plate.

Yet a further object of the present invention is to provide an improved structure of a working platform, wherein the horizontal beam, facing the connection of the flat plate, is protruded out with a plurality of horizontal support blocks.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
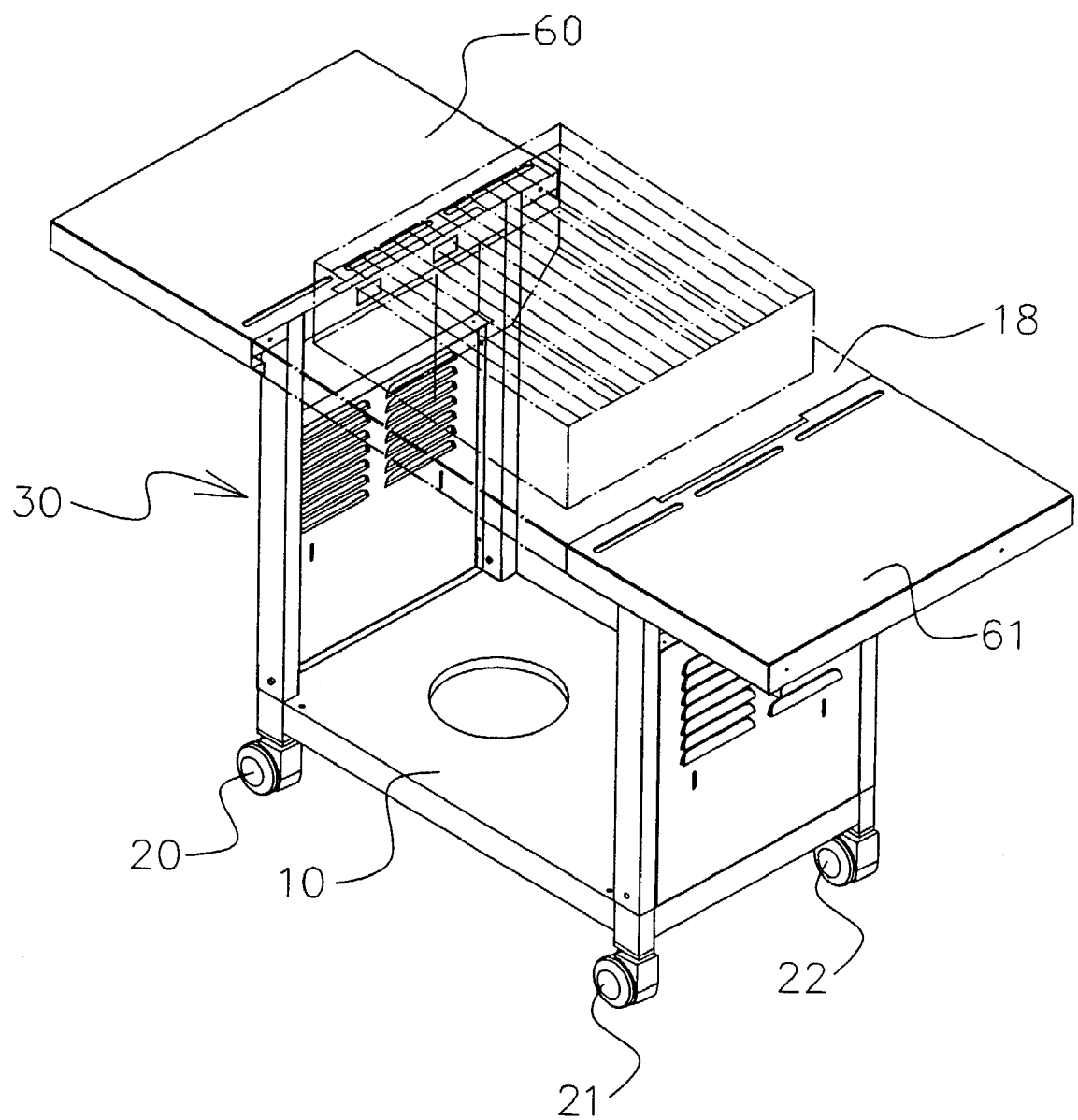
FIG. 1 is a perspective view of the working platform in accordance with the present invention.
Figure 2:
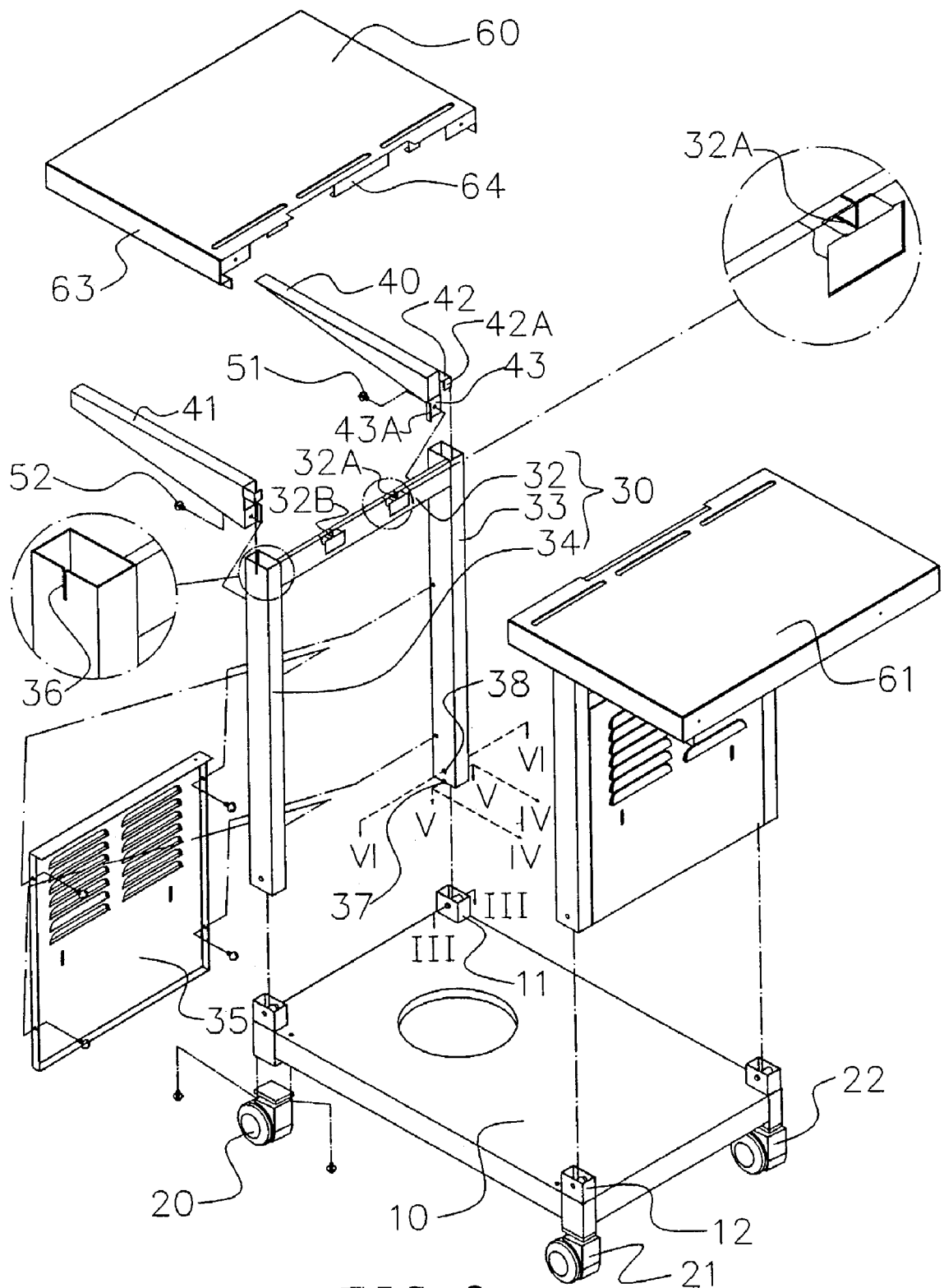
FIG. 2 is an exploded perspective view of the working platform in accordance with the present invention.

Referring to FIGS. 1 and 2, there is shown the working platform structure 18 comprising a rectangular base plate 10, four rollers 20, 21, 22, a pair of inverted U-shaped frame supports 30, 31, at least a pair of lateral support rod 40, 41, a plurality of screws 51, 52 and at least a lateral flat plate 60, 61, wherein the four corners of one face of the base plate 10 are mounted with the rollers 20, 21, 22 and the other face of the base plate 10 is disposed with connection blocks 11, 12, and the frame supports 30, 31 comprises a horizontal beam 32 having two ends bent to form an erect tubes 33, 34 and the horizontal beam 32 is protruded with a plurality of horizontal holding blocks 32A, 3213 along the direction of the lateral flat plate 60 so that a lateral shielding plate 35 is formed between the two erect tubes 33, 34, and the erect tubes 33, 34 connect other tube opening of the horizontal beam 32 is inserted correspondingly to the connection blocks 11, 12. The other end of the erect tube 33, 34 is provided with a fastening slit 36, and one rod end of the lateral support rod 40, 41 bends out to form a top fastening plate 42 and a bottom fastening plate 43. The tip 43A of the bottom fastening plate 43 can fasten with the other side of the straight fastening slit 36 of the erect tubes 33, 34, and the tip 42A of the top fastening plate 42 can directly fasten to the fastening slit 36. The inner edge of the bottom fastening plate 43 is provided with lateral support rod 40, 41 for the supporting of a flat plate 60.

Figure 3:
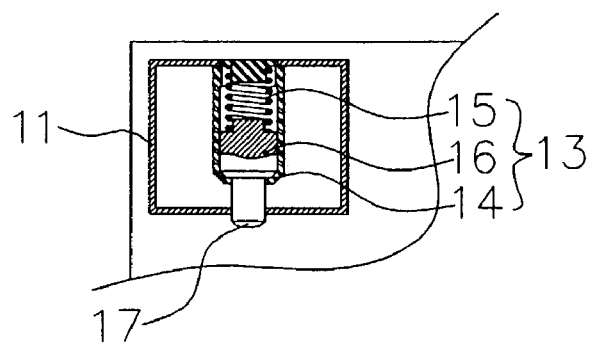
FIG. 3 is a sectional view along III—III of FIG. 2 of the present invention.
Figure 4:
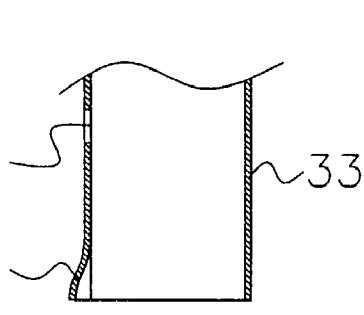
FIG. 4 is a sectional view along line IV—IV of FIG. 2 of the present invention.
Figure 5:
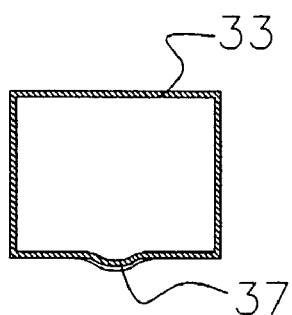
FIG. 5 is a sectional view along line V—V of FIG. 2 of the present invention.
Figure 6:
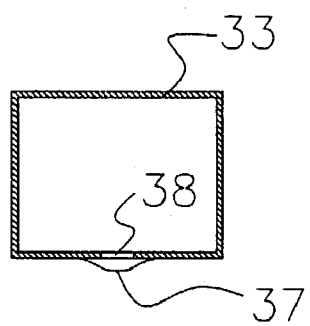
FIG. 6 is a sectional view along line VI—VI of FIG. 2 of the present invention.
Figure 7:
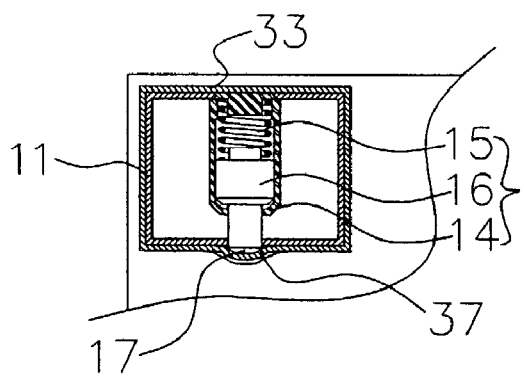
FIG. 7 is a sectional view of FIG. 3 mounted to FIG. 4 of the present invention.
Figure 8:
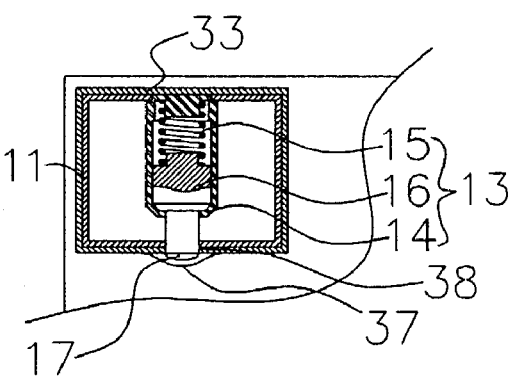
FIG. 8 is a sectional view of FIG. 3 mounted to FIG. 5 of the present invention.
Figure 9:
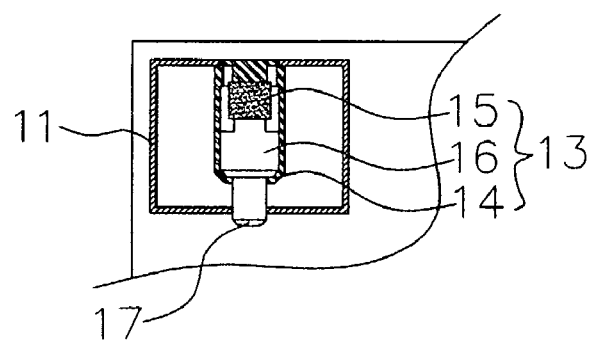
FIG. 9 is another sectional view of FIG. 2 of the present invention.

As shown in FIG. 3, the connection block 11 is provided with an elastic peg 13 having one end being a locking sleeve 14 enclosing an elastic body 15 stackingly connected to a locking rod 16. As shown in the figure, the elastic body is a spring and the other end of the locking rod 16 is a tapered locking head 17 passed through the locking sleeve 14, and through the wall of the connection block 11, as shown in FIGS. 4 and 5. The side edge of the tube opening of the erect tube 33, corresponding to the peg head 17, is formed into a protruded arch-wall 37, as shown in FIGS. 4 and 6, the erect tube 33 is fully mounted to the connection block 11. The tube wall position contacting the peg head 17 is provided with a through hole 38. Thus, when the connection block 11 is inserted into the erect tube 33, as shown in FIG. 7, the pushing of the arch face of the arch wall 37 assists the squeezing the peg head 17. When the connection block 11 has fully squeezed into the erect tube 33, as shown in FIG 8, the peg head 17 faces the through hole 38 such that the peg head 17 is automatically passed through the through hole 38, the erect tube 33 is engaged with the connection block 11. When the erect tube 33 is to be disengaged from the connection block 11, the peg head 17 is pressed to release from the through hole 38, the erect tube 33 is pulled out from the connection tube 11, as shown in FIG 9. The elastic body 15 within the sleeve 14 is a rubber block with elasticity.

Figure 10:
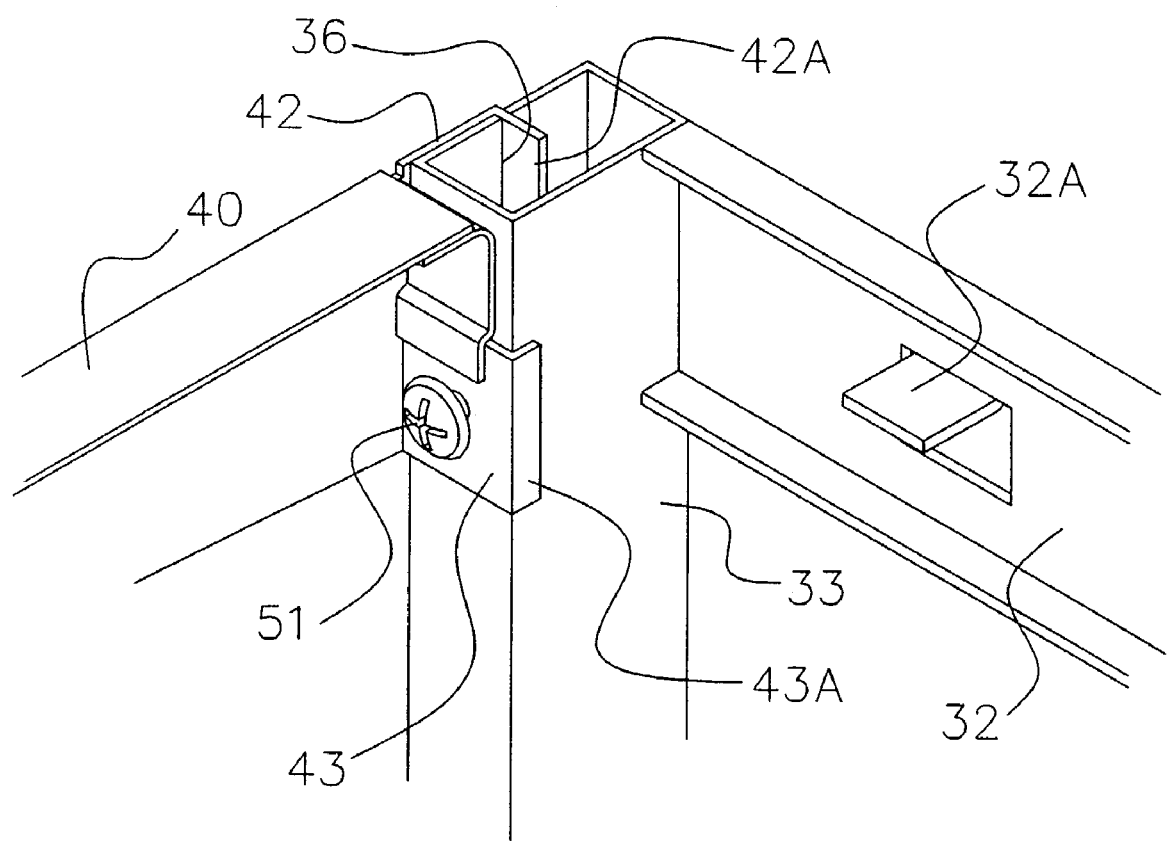
FIG. 10 is a schematic view showing the side support combining with the erect tube of the working platform in accordance with the present invention.

FIG 10 shows the lateral support rod in connection with the erect tube. The space defined by the top fastening plate 42 and the bottom fastening plate 43 can enclose the external of the top end of the erect tube 33. In combination, the corner of the tube at the other end of the fastening slit 36 slides down, and the tip 42A of the top fastening plate can be fastened with the straight fastening slit 36. After that the screw 71 at the inner edge of the bottom fastening plate 43, passed through the support rod 40 to urge with the erect tube 33. Thus, a secured structure is formed. If the screw 51 is loosened, the support rod 40 can be removed.

Figure 11:
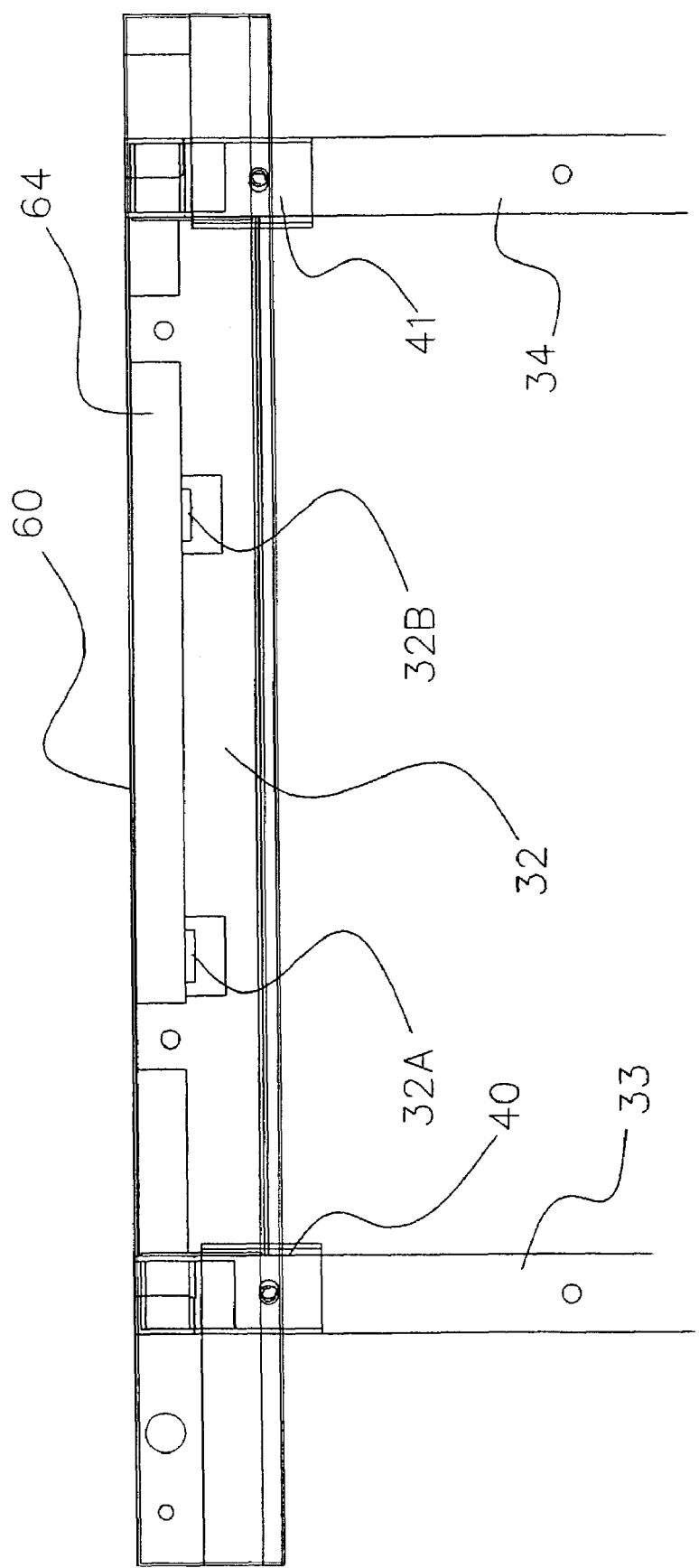
FIG. 11 is a sectional view showing the horizontal beam connecting the flat plate of the working platform in accordance with the present invention.

Referring to FIG 11, the two ends of the plate 60 protruded from the lateral plate 62, 63 to the external side of the support rod 40 and a plurality of the support blocks 32A, 32B protruded from the horizontal beam 32 which also connected to the plate edge of the bonding plate 64 corresponding to the flat plate 60. Thus, the structure can be easily dismantled and assembled.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An improved structure of a working platform having a rectangular base plate, four rollers, a pair of inverted U-shaped frame supports, at least a pair of lateral support rods, a plurality of screws and at least a lateral flat plate, characterized in that four corners of one face of the base plate are mounted with the rollers and the other face of the base plate is disposed with connection blocks, and the frame supports comprise a horizontal beam having two ends bent to form two erect tubes and the horizontal beam is protruded with a plurality of horizontal holding blocks along a direction of the lateral flat plate so that a lateral shielding plate is formed between the two erect tubes, and the erect tubes connect other tube opening of the horizontal beam is inserted correspondingly to the connection blocks, and the other end of each of the erect tubes is provided with a fastening slit, and one rod end of the lateral support rod bends out to form a top fastening plate and a bottom fastening plate, and a tip of the bottom fastening plate is releasable fastened with the other side of the straight fastening slit of the erect tubes, and a tip of the top fastening plate is directly releasable fastened to the fastening slit, and an inner edge of the bottom fastening plate is provided with a lateral support rod for supporting of a flat plate.

2. The working platform of claim 1, wherein the connection block is provided with elastic peg having one end thereof protruded out of the wall of the connection block, and the opening of the erect tube corresponding to the position of the squeezing of the peg head is formed into an externally protruded arch wall, and the erect tube is fully mounted to the connection tube, the tube wall position closely contact with the peg head having a through hole so that when the connection block is mounted into the erect tube, the pushing of protruded arch face facilitates the squeezing of the peg head, and when the connection block is fully within the erect tube, the peg head faces the through hole so that the peg head automatically passes through the through hole, and the erect tube is engaged with the connection block.

3. The working platform of claim 1, wherein the horizontal beam, facing the connection of the flat plate, is protruded out with a plurality of horizontal support blocks.

4. The working platform of claim 3, wherein a lateral shielding plate is formed on the inverted U-shaped frame between two erect tubes.

5. The working platform of claim 2, wherein the elastic peg having one end passed through the peg sleeve is an elastic body stacked to a peg rod, and the peg rod stacked with the other end of the elastic body is tapered beyond the opening of the peg sleeve and through the wall of the connection block.

6. The working platform of claim 5, wherein the elastic body is a circular spring.

7. The working platform of claim 5, wherein the elastic body is a rubber block.

* * * * *